US009609975B2

(12) United States Patent
Wolfe

(10) Patent No.: US 9,609,975 B2
(45) Date of Patent: *Apr. 4, 2017

(54) DEVICE FOR STIRRING AND COOKING FOOD

(71) Applicant: Amy Wolfe, Dacula, GA (US)

(72) Inventor: Amy Wolfe, Dacula, GA (US)

( * ) Notice: Subject to any disclaimer, the term of this patent is extended or adjusted under 35 U.S.C. 154(b) by 351 days.

This patent is subject to a terminal disclaimer.

(21) Appl. No.: 14/159,383

(22) Filed: Jan. 20, 2014

(65) Prior Publication Data

US 2014/0134305 A1 May 15, 2014

Related U.S. Application Data

(63) Continuation of application No. 13/350,976, filed on Jan. 16, 2012, now Pat. No. 8,640,606, which is a continuation of application No. 12/106,309, filed on Apr. 20, 2008, now Pat. No. 8,122,815.

(60) Provisional application No. 60/912,971, filed on Apr. 20, 2007.

(51) Int. Cl.
*A47J 36/00* (2006.01)
*A47J 27/00* (2006.01)
*A47J 36/16* (2006.01)
*A47J 43/046* (2006.01)
*A47J 43/07* (2006.01)

(52) U.S. Cl.
CPC .......... *A47J 27/002* (2013.01); *A47J 27/004* (2013.01); *A47J 36/165* (2013.01); *A47J 43/046* (2013.01); *A47J 43/0727* (2013.01)

(58) Field of Classification Search
CPC .............................. A47J 27/004; A47J 36/165
USPC .......................................................... 99/348
See application file for complete search history.

(56) References Cited

U.S. PATENT DOCUMENTS

| | | | | |
|---|---|---|---|---|
| 3,691,938 A | * | 9/1972 | Nichols | A47J 36/165 366/249 |
| 4,049,243 A | * | 9/1977 | Kramer | A47J 36/165 366/248 |
| 4,325,643 A | * | 4/1982 | Scott | A47J 43/044 241/101.1 |
| 4,649,810 A | * | 3/1987 | Wong | A47J 27/14 222/501 |
| 4,706,558 A | * | 11/1987 | Snyder, Jr. | A23G 3/24 366/146 |
| 4,763,567 A | * | 8/1988 | Dalquist, III | A47J 36/165 366/247 |

(Continued)

*Primary Examiner* — David Angwin
*Assistant Examiner* — Lawrence Samuels
(74) *Attorney, Agent, or Firm* — John L. Doughty

(57) ABSTRACT

A cooking device and method heats a removable vessel with heaters of a cooking capsule, which includes a separator wall between the heaters and vessel. The heaters mount to the separator wall. The capsule is fixed in a housing, which also mounts a motor that rotates the vessel. The housing tiltably mounts on a base. Accessories can be fixed to the vessel or a lid secured to the housing, so the accessories can rotate with the vessel or remain stationary with respect to the vessel as it rotates. A locking mechanism that secures the lid to the housing prevents lid detachment when the vessel counter-rotates and an accessory is fixed to the lid. A heat sink wall reflects heat toward the vessel and fins draw heat from the heat sink wall away from the housing and out vent holes. Computer hardware and software control power to the motor and heaters.

20 Claims, 10 Drawing Sheets

(56) References Cited

U.S. PATENT DOCUMENTS

| | | | | |
|---|---|---|---|---|
| 4,779,522 A * | 10/1988 | Wong | ............ | A47J 27/14 |
| | | | | 74/436 |
| 5,363,746 A * | 11/1994 | Gordon | ............ | A23G 9/12 |
| | | | | 366/145 |
| 5,512,733 A * | 4/1996 | Takikawa | ............ | H05B 6/1227 |
| | | | | 219/620 |
| 5,524,530 A * | 6/1996 | Nijzingh | ............ | A47J 43/085 |
| | | | | 241/37.5 |
| 5,819,636 A * | 10/1998 | Khashoggi | ............ | A47J 27/14 |
| | | | | 366/146 |
| 5,980,099 A * | 11/1999 | Soon | ............ | B01F 15/00448 |
| | | | | 366/204 |
| 6,089,143 A * | 7/2000 | Figueroa | ............ | A47J 19/04 |
| | | | | 366/145 |
| 8,122,815 B2 * | 2/2012 | Wolfe | ............ | A47J 36/165 |
| | | | | 219/389 |
| 8,640,606 B2 * | 2/2014 | Wolfe | ............ | A47J 36/165 |
| | | | | 219/389 |
| 8,707,862 B1 * | 4/2014 | Oliver | ............ | A47J 36/165 |
| | | | | 99/326 |
| 2005/0223906 A1 * | 10/2005 | Xu | ............ | A47J 27/004 |
| | | | | 99/348 |
| 2006/0044935 A1 * | 3/2006 | Benelli | ............ | A47J 27/004 |
| | | | | 366/145 |
| 2006/0219100 A1 * | 10/2006 | Gelfand | ............ | A47J 43/046 |
| | | | | 99/348 |
| 2008/0190301 A1 * | 8/2008 | Peng | ............ | A47J 36/165 |
| | | | | 99/348 |
| 2009/0120301 A1 * | 5/2009 | Severnak | ............ | A47J 27/004 |
| | | | | 99/331 |
| 2012/0114815 A1 * | 5/2012 | Wolfe | ............ | A47J 36/165 |
| | | | | 426/231 |

\* cited by examiner

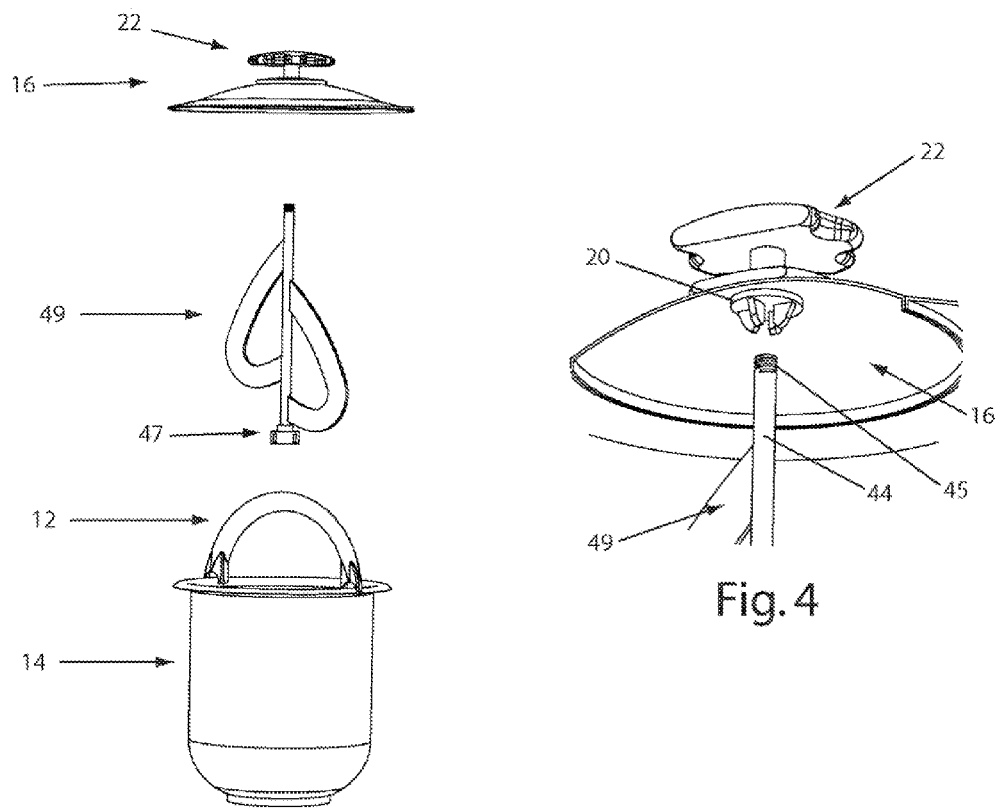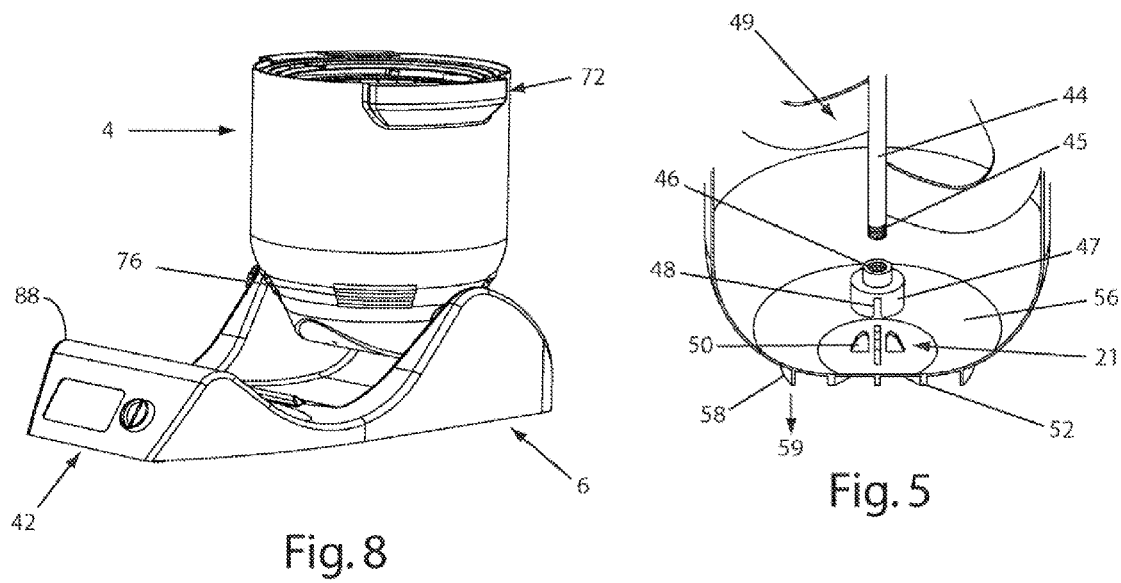

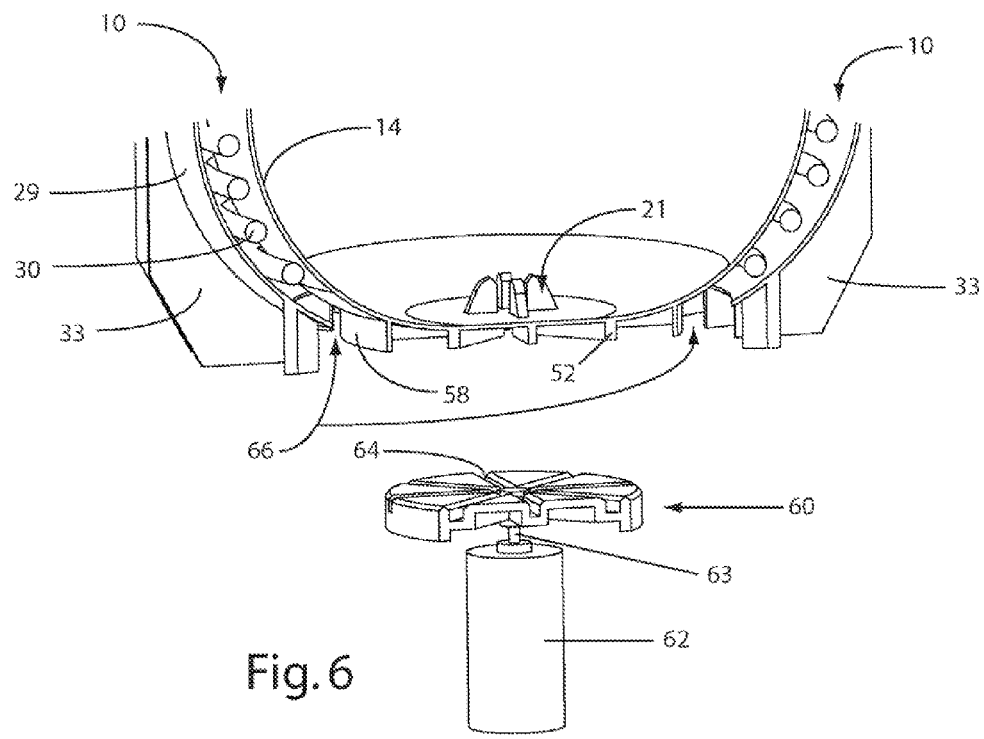
Fig. 6
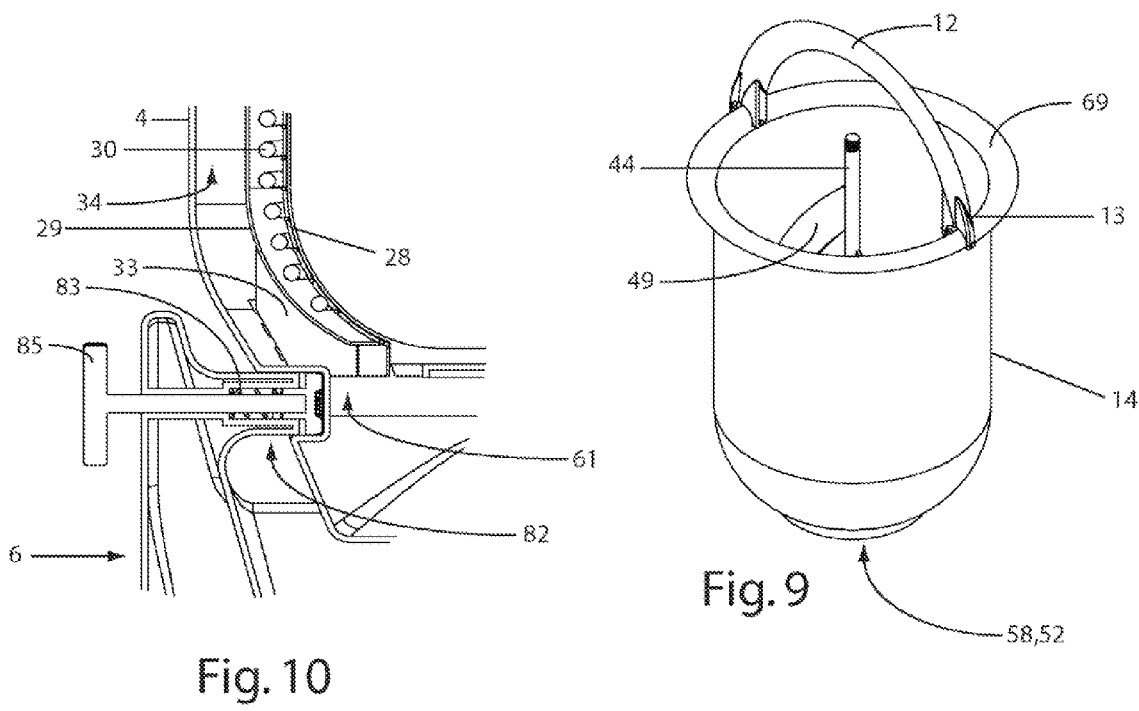
Fig. 10
Fig. 9

Examples of Programing Ability

| Function | Symbol |
|---|---|
| TIME | ⏱ |
| TEMPERATURE | 🌡 |
| SPEED | |
| ROTATION | |
| TILT | |

Chicken Steps

| | warm | cook thru | brown | keep warm |
|---|---|---|---|---|
| TIME | 5 | 10 | 5 | 15 |
| TEMPERATURE | ML | M | MH | L |
| SPEED | 4 | 6 | 8 | 2 |
| ROTATION | F | F | R | F |
| TILT | 60 | 30 | 20 | 60 |
| ACCESSORY USED | Single Paddle | | | |

Frozen Vegetables in Light Sauce

| | thaw | heat & cook | keep warm |
|---|---|---|---|
| TIME | 5 | 10 | 10 |
| TEMPERATURE | L | M | L |
| SPEED | 2 | 6 | 4 |
| ROTATION | F | F | F |
| TILT | 60 | 30 | 60 |
| ACCESSORY USED | Double Paddle | | |

Pasta Noodles

| | boil water | cook noodles | pull to drain |
|---|---|---|---|
| TIME | 8 | 10 | 0 |
| TEMPERATURE | H | MH | 0 |
| SPEED | 0 | 0 | 0 |
| ROTATION | 0 | 0 | 0 |
| TILT | 90 | 90 | 90 |
| ACCESSORY USED | Colander | | |

Fig. 13

DEVICE FOR STIRRING AND COOKING FOOD

CROSS REFERENCE TO RELATED APPLICATION

This application claims priority under 35 U.S.C. 120 to, and is a continuation of, U.S. patent application Ser. No. 13/350,976 entitled "Device for stirring and cooking food," which was filed Jan. 16, 2012, which is a continuation of U.S. patent application Ser. No. 12/106,309 entitled "Device for stirring and cooking food," which this application claims priority to, and which was filed on Apr. 20, 2008, and which claims priority under 35 U.S.C. 119(e) to U.S. provisional patent application No. 60/912,971 entitled "Electric rotating auto-wok grill," which was filed Apr. 20, 2007, and to which this application claims priority to, all of which are incorporated herein by reference in their entireties.

FIELD OF THE INVENTION

The present invention relates to a food cooking device, and more particularly, to a device that cooks food while stirring/rotating the food.

BACKGROUND

The ability to cook prepared food easily, quickly, consistently, and economically is a recognized need. Automation is a highly desired feature of household and industrial cooking devices. Another desirable aspect of a cooking device is the ability to heat/cook foods of differing types and viscosity together. Rotational cooking facilitates consistency of outcome over a wide variety foods and recipes. Furthermore, automating the rotational cooking further enhances consistency.

Tilting a rotational cooking unit over a range of angles facilitates variable cooking functions, which in turn can facilitate variable recipes and food types. The addition of stirring/mixing apparatus into a rotating cooking vessel can further facilitate quality and consistency of the end result.

Thus, if all of these features are available to an end user, he, or she, need not be proficient at cooking to attain quality and consistency in his, or her, preferred prepared items. Controlling time, temperature and speed, as well as rotation, tilt and direction typically affect to the outcome of a given recipe. In addition, varying these functions during the time a recipe is cooking can further help a user attain perfect, and, possibly, consistently unique results.

All foods and substances are not created equal, and it is important to be able to adjust automated functions individually, or in connection with each other, to make sure the contents are uniformly heated throughout the entire mass and/or browned and/or mixed to the desired end result of the contents as a whole. However, a user may not wish to stand close by food being cooked to change the functions and to monitor the cooking food for safety purposes. Thus, there is a need in the art for a method and system for facilitating the functions of rotating, heating, mixing/stirring, tilting and sealing that do not require that a user remain in proximity to the device performing the cooking functions.

Furthermore, safety in cooking devices is always a concern. For devices into which liquids are introduced and heated, there is a need to prevent spillage during operation or during idle. Another safety hazard is heating or burning of an object, person or animal that contacts a housing of a cooking device. While cooking devices are expected to be warm to the touch during operation, serious burning to an item that contacts the housing is not acceptable. Thus, there is a need to provide a method and system that can facilitate the features discussed above and still provide a wide margin of safety to a user and the device's surroundings.

In addition, since cooking in liquid typically causes steam, or at least higher pressure due to expansion of the cooking liquid as it heats, internal pressure in a cooking unit should be relieved to prevent injury to a user by the inadvertent removal of a lid or unexpected, instantaneous, depressurization of the unit. Thus, there is a need in the art for a method and system for cooking food that equalizes pressure between the inside and outside of a cooking vessel. Others have attempted to facilitate a few of the above-mentioned desirable features in cooking devices, an example of such an attempt being an automated rotating cooker. Devices for indoor grilling or slow cooking of food utilize stationary cooking surfaces such as heated plates, grills, or ceramic pots to heat food by touching only one or two surfaces of the food within. Some rotational and cylindrical cooking devices present continuous contact of a heated surface to the contents of the device.

A few devices have included spatulas connected to the base or other parts to move across a stationary cooking surface to aid in stirring the food. Furthermore, a few devices have permanently incorporated paddles onto the interior wall of the vessel to aid in stirring the contents.

However, known devices have many shortcomings that can be traced to the following:

Conventional devices in use for indoor grilling or slow cooking of food have stationary cooking surfaces, which limit and localize the heating of the food by those devices. In those devices, the same part of the food being cooked typically remains in contact with the heated surface, or surfaces, thus not allowing the food to be evenly cooked.

Moreover, these conventional grilling devices do not allow for automated, unattended cooking or preparation of the food. These conventional devices require constant attention by the user in order to manually stir or move the food inside the device to avoid improper or uneven cooking and poor quality in the results.

These conventional grilling devices present the danger of an unattended unit burning or singeing the food contained within and possibly causing safety issues for a house or workplace through the creation of smoke or fire.

Furthermore, conventional devices may undercook portions of the food that are too far from the cooking surface, thus presenting the possibility of food poisoning, because one portion of the food may look browned and cooked to the operator, thereby misleading the user to think all the food is cooked to the appropriate temperature.

Devices used for grilling do not allow the introduction of liquid into the cooking method.

Other shortcomings of known cooking devices used for slow cooking include the lack of optional immediate cooking or grilling or boiling at a higher surface temperature, and require the presence of liquid to achieve results. Known cooking devices also do not have the ability to alternate automatically or manually between grilling, boiling, and slow cooking, and many known devices have only one resting position for use and do not distinguish between types of foods being cooked or allow the introduction of an infinite number of accessory devices to aid in the differing types of food being cooked.

In addition, known devices that may rotate only facilitate rotation in a single direction, potentially limiting a preferred method of cooking or stirring contents. Another shortcoming of known devices is that known devices provide heat at a predetermined location or area, but do not allow for multiple, separately controllable, heat sources that can vary the locations of a cooking surface to which they provide heat. Also, they only have one, or very few, positions of tilt, and do not safely secure the tilt of a cooking portion. Known devices allow for setting timing and temperature, and sometimes tilt, but not rotation direction or speed. Furthermore, known devices do not allow for automated programming or setting of all of the parameters of time, temperature, direction and rotation speed individually or collectively with respect to each other and other parameters.

Thus, known devices, due to the limited features of settings, tilt, accessories, speed, and rotation, limit the types of food or substances that can successfully be prepared in the device. Thus, there is a need in the art to address and rectify the shortcomings of the known cooking devices.

SUMMARY

This application describes an improved cooking device and method by which foods or other substances are mixed, tumbled, stirred, heated and/or cooked inside a vessel that may be rotated, tilted, and/or positioned angularly. The cooking device and method overcomes the aforementioned shortcomings of other's devices.

Therefore, an aspect provides a moving, rotating, cooking surface that cooks food and ensures even cooking of all the food in the device and reduces the likelihood of overcooking, burning and/or singeing part of the food while undercooking another portion of the food.

Another aspect facilitates reversing rotation of the cooking surface.

Another aspect provides a cooking device that does not require constant attention by the operator to achieve to maximum quality control of preparing differing types of foods or substances.

Another aspect facilitates programmable controls for varying the time, temperature, speed or rotation, and combinations thereof of the cooking surface.

Another aspect provides a cooking device that is ultimately versatile with respect to the type, viscosity and density of the food introduced for cooking.

Another aspect allows the operator to adjust the tilt position, or angle, of the cooking surface to accommodate the particular type of food being introduced for cooking.

Another facilitates an almost unlimited number of designs/shapes of accessories to aid stirring, cooking, or preparation of the food contained therein, thereby allowing the customization of the cooking method according to the food type. Furthermore, individual accessories can perform different functions by interchanging their positions and mounting hardware. The interchangeable mounting hardware secure the accessories to accommodate high torque conditions resulting from cooking differing viscosities of food and at differing rotation, speed, and direction of the cooking surface vessel.

Another aspect provides multiple heating locations that a user can separately control to allow for further variations and finer control in cooking food.

Another aspect provides a unique handle for lifting the removable vessel from the housing of the device.

Another aspect enhances a safe working environment for the operator by reflecting heat from the separately controllable heaters toward the cooking vessel and away from the housing of the device. Further aiding in keeping the user safe from injury is the constant passive depressurization through venting. The devices also enhances safety by providing means for preventing spillage of the entire contents of the vessel while in place in the device.

Another aspect provides a unique lid which interlocks with the housing and incorporates a coupler for attaching accessories being introduced into the vessel for a particular cooking method. A further aspect of the lid is to allow it to have optional resting positions on the housing and/or base during non-use while disengaged from the device.

Thus, aspects combine the independent conveniences and uses of the indoor grill, the wok, the rotisserie, and the slow cooker into one, automated device that improves the design and method of cooking by adding additional rotation, tilt, and stirring abilities in safe, stable, and user friendly interface.

DESCRIPTION OF THE DRAWINGS

FIG. 4 illustrates a detailed view of a lid, knob and lid coupler hub for covering a cooking vessel in a cooking device housing.

FIG. 5 illustrates a detailed view of accessory mounting, drive transmission and stabilizing features of a cooking vessel.

FIG. 6 illustrates a transmission for coupling a motor to a rotatable cooking vessel.

FIG. 8 illustrates an exploded view of removable components of a cooking device.

FIG. 9 illustrates the removable vessel and integral vessel handle.

FIG. 10 illustrates details of a locking manual tilt mechanism.

FIG. 13 illustrates in diagram format a few of the infinite programmable settings a digital or computerized type controller can be made to actuate for varying the operations and settings intended for the device.

DETAILED DESCRIPTION

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The following disclosure is not intended nor is to be construed to limit the present invention or otherwise to exclude any such other embodiments, adaptations, variations, modifications and equivalent arrangements, the present invention being limited only by the claims appended hereto and the equivalents thereof.

Figure 1:
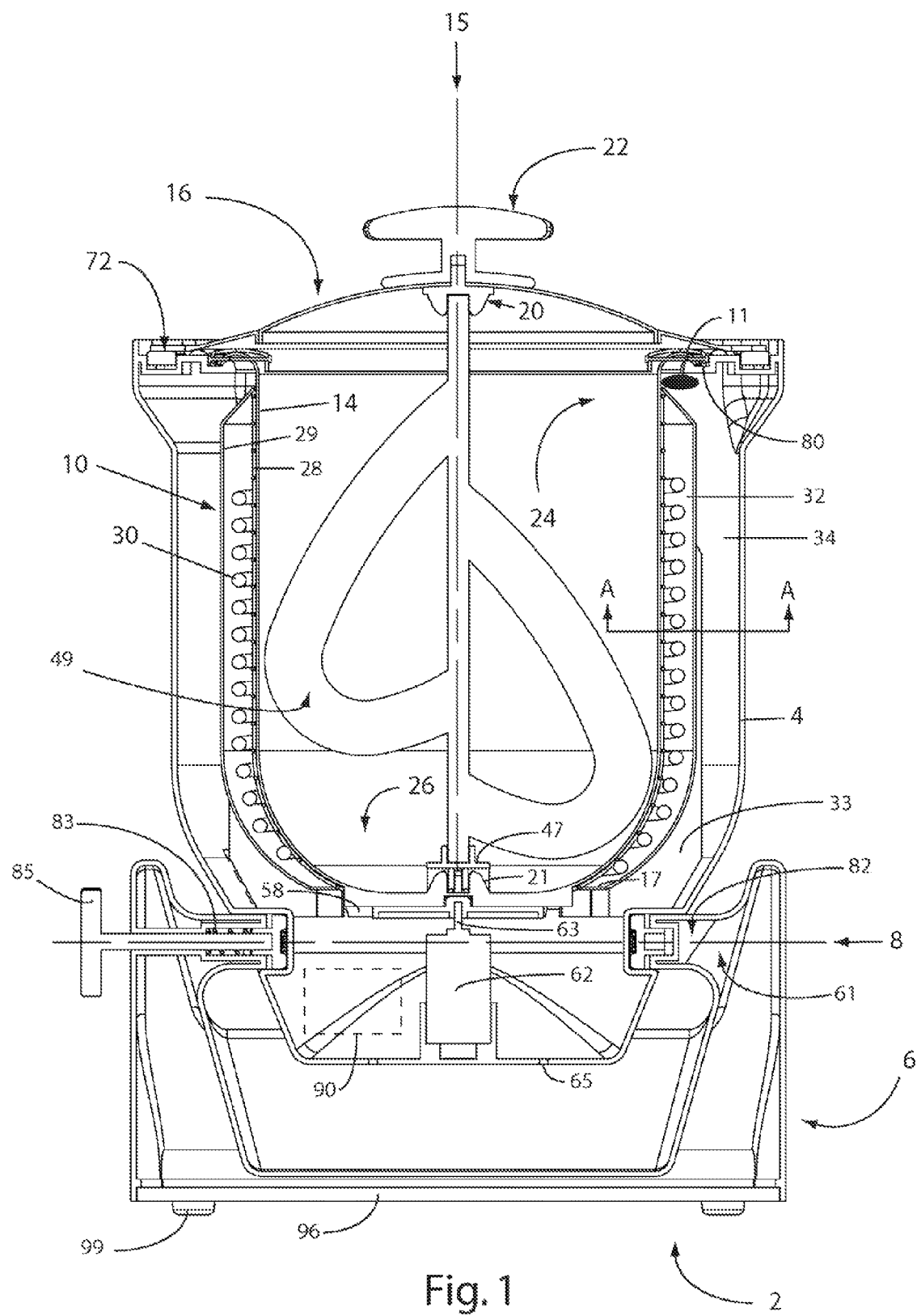
FIG. 1 illustrates an elevation section view of a cooking device for tilting and rotating a cooking food with an optional accessory in place.

Turning now to the figures, FIG. 1 illustrates a device 2 for stirring and cooking food. Device 2 includes a housing 4 that is coupled to base 6. Preferably, housing 4 is tiltably coupled to base 6, so that the housing can tilt from a substantially vertical position (the position showing in the figure) to a substantially horizontal position about tilt axis 8. Cooking capsule 10 is coupled to housing 4 and includes heating elements 30. Elements 30 are preferably metal electrical heating element material wrapped in a spiral or meandering fashion to direct heat toward vessel 14. Vessel 14 is removable from capsule 10, and a motivating device 62, such as a motor, can rotate vessel 14 about center axis 15 in any position housing 4 is tilted on axis 8. Lid 16 separates food or other items being cooked in vessel 14 from atmosphere external to housing 4. Lid 16 is secured in place by retainer 72 against housing 4. Lid coupler hub 20 retains knob 22 to lid 16 and also serves as a mount point for an accessory rod that spans from the distal end 24 of vessel 14 to the proximal end 26 of the vessel. Section A-A indicates a section shown in more detail in FIG. 2.

Figure 2:
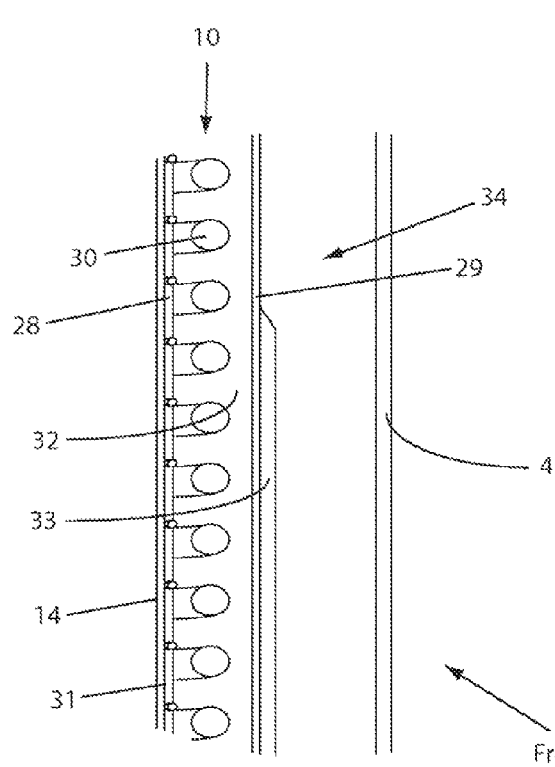
FIG. 2 illustrates a detailed section view of a vessel wall, cooking capsule walls and heaters and housing section when the vessel is located in the capsule.
Figure 14:
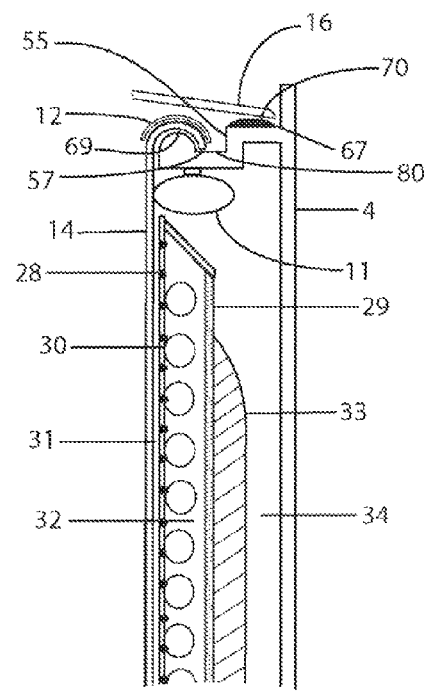
FIG. 14 illustrates a detail section view of the distal end a device housing with a vessel located thereby and a lid secured thereon.
Figure 11F:
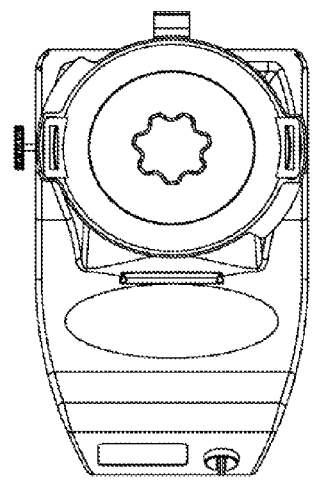
FIGS. 11f and g illustrate plan views of a cooking device with the lid locked (FIG. 11f) unlocked and locked (FIG. 11g) by a spring loaded button.
Figure 11G:
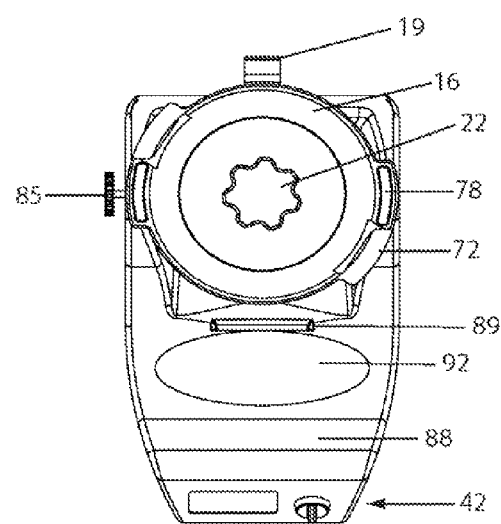
FIG. 11 illustrates a perspective view of the exterior of the cooking device with the lid in an unlocked position.
FIGS. 11a, b and c illustrate side view examples at three different tilt positions available of a cooking device housing.
FIG. 11d illustrates a perspective view of a cooking device with the lid removed and hanging on the lid hanger on the exterior of the housing.
FIG. 11e illustrates a perspective view of a cooking device with the lid removed and resting in the lid rest area of the lower/base housing.

Turning now to FIG. 2, the figure illustrates a detailed section view A-A as referenced in FIG. 1. The vessel, represented in the section view by its wall 14, is shown having been received into capsule 10. Capsule 10 includes separator, represented by separator wall 28 and heat sink wall 29, and heaters 30. Capsule 10 is preferably fixed to housing 4 thus locating the capsule in the housing and providing support to the capsule, so that the capsule is aligned with respect to vessel 14 when the vessel has been received into the capsule. It will be appreciated that gap 31 may exist when vessel 14 is located in capsule 10. However, incidental, or superficial contact between vessel wall 14 and separator wall 28, while not preferred or desirable may occur. In addition, air gap 32 exists between heaters 30 and separator wall 29—it is desirable that the heaters do not contact wall 29. However, walls 28 and 29 may be formed from a single piece of sheet metal, or multiple sheets of sheet metal, for example, or other material as deemed appropriate, and the single sheet, or multiple sheets, may emanate into walls 28 and 29 from near the proximal end of capsule 10.

As discussed above, walls 28 and 29 may be formed from separate pieces of sheet metal. For example, wall 29 may be formed from solid sheet metal whereas wall 28 may be formed from perforated sheet metal, mesh, or even wire assembled as a grid wherein the wires are spaced at a distance greater than the diameter of the wire. Wall 29 could also be formed from perforated sheet metal, mesh or a grid, or other arrangement that allows air to pass through the wall as does the same arrangements when used as wall 28.

Thus, separator walls 28 and 29 can provide the advantage of diffusing heat emitted from heaters 30 so that the heat is radiated evenly toward vessel 14 and can be reflected, and thus attenuated, away from housing 4, which may be formed from plastic, metal or other rigid material. Reflection by wall 29 provides the advantage of reducing heat that is incident upon housing 4 and also increases the heat that is directed toward vessel, thus, enhancing efficiency of device 2 of cooking food in vessel 14, as less energy would be used by heaters 30 to attain and maintain a predetermined temperature in vessel 14. Heat sink fins 33 are shown coupled to reflector wall 29 and dissipate heat from the reflector wall into air space 34 between wall 29 and housing 4. It will be appreciated that air space 34 is substantially greater volume that spaces 31 and/or 32 because the distance between wall 29 and housing 4 is substantially greater that the distance between wall 28 and heaters 30, or heaters 30 and wall 29, respectively.

Heaters 30 are preferably electric heating elements, such as heating element rod material as may be used in typical kitchen devices. Heaters 30 could also be gas burners, as might be desired if device 2 is large and used in a commercial setting such as a restaurant. In such as commercial use of device 2, the heat diffusing properties of separator walls 28 and 29 would provide the benefit that the heat gradient that would be produced by just a few burners directing heat at vessel 14 would be smoothed, thus reducing uneven cooking of food in the vessel. Other heating methods may be effective and as such may change a few of the parameters of the components of the device relating to spacing, size, placement, or fit.

Figure 3:
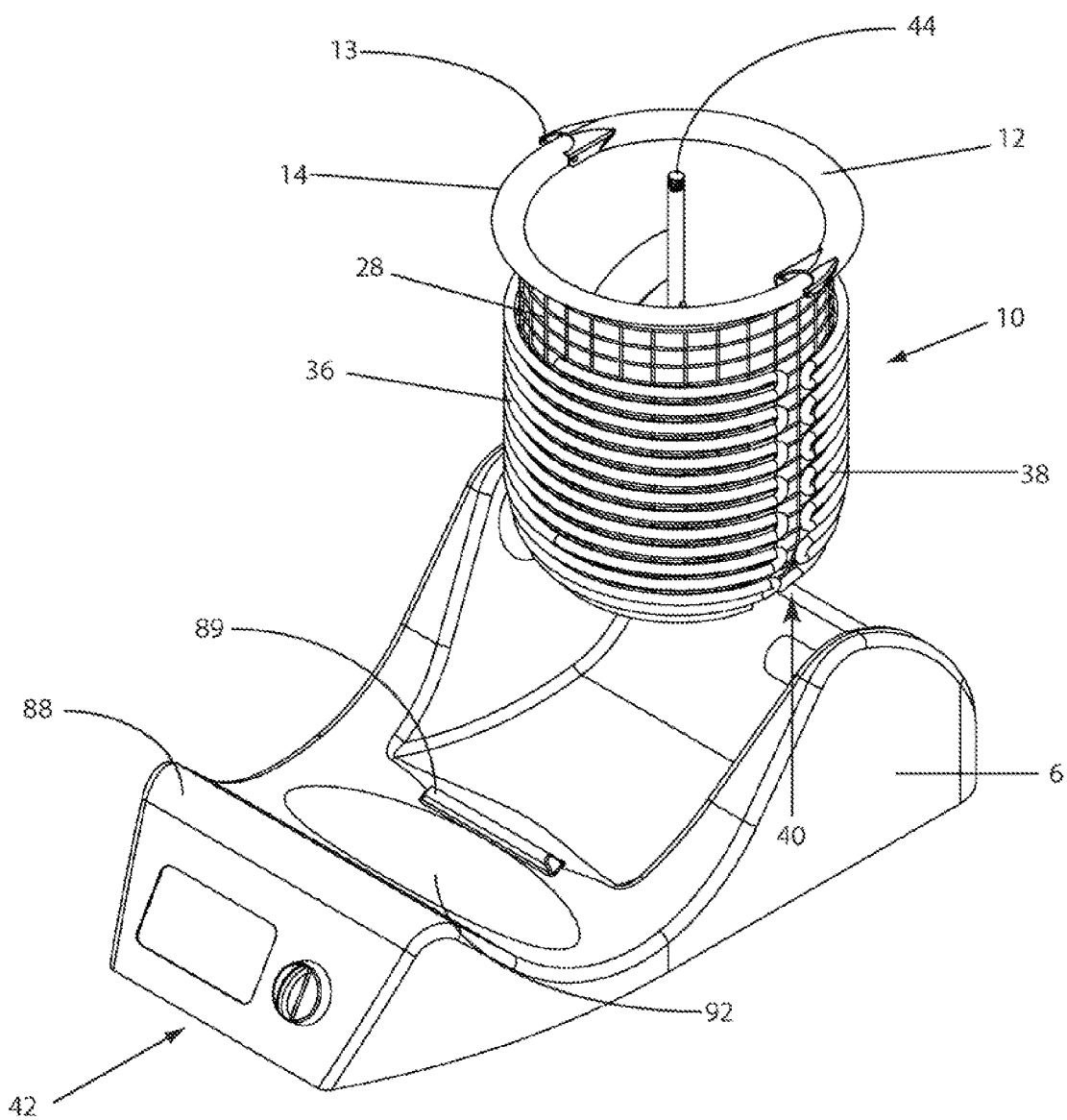
FIG. 3 illustrates a cooking vessel located in a cooking capsule and shows an exposed view of the heating elements.

Turning now to FIG. 3, vessel 14 is shown having been received into and located in capsule 10. Separator wall 29 of capsule 10 is not shown, and separator wall 28 is shown as wire, or wires, assembled as a grid as discussed above in reference to FIG. 2. It will be appreciated that the figure illustrates heaters 30 as comprising first element 36 and second element 38, the first and second elements being assembled so that they each respectively reverse direction approximately along a vertical imaginary line 40. Having two separate elements 36 and 38 provides the advantage that each can be independently controlled with controls 42 mounted on base 6 as shown in the figure. Thus, for example, if capsule 10 and vessel 14 were tilted into a nearly horizontal position (along with housing which is not shown in FIG. 3) second element 38 could provide heat to the vessel so that food inside it could be kept warm with out being in direct contact with a portion of the vessel's wall that is very close to the element providing heat. It will be appreciated that instead of elements 36 and 38 being separated in vertically along direction line 40, the elements could be divided along a annular direction line running around vessel 14 at an approximately half way distance between distal end 24 and proximal end 26 of vessel 14, for example.

Turning now to FIG. 4, the figure illustrates a detailed view of lid 16, knob 22 and lid hub 20. Hub 20 retains knob 22 to lid 16. In addition, hub 20 provides a mounting/locating point for accessory rod 44, by functioning as a locating bearing in which rod 44 can spin inside castellated keys 54 with respect to lid 16.

Turning now to FIG. 5, the figure illustrates some aspects of vessel 14. The bottom (with respect to the orientation of vessel 14 when it is in an approximately vertical orientation) of accessory rod 44 is shown with threads 45 that engage with threads 46 of coupler nut 47. Coupler nut 47 defines one or more keyways 48 to engage keys 50 of vessel hub 21, or keys 54 of lid hub 20 as shown in FIG. 4 if a user desires to fix accessory rod 44 to lid 16. It will be appreciated that vessel 14 may have one key 50 and one corresponding keyway 48, a plurality of keys and keyways, or and other known arrangements for coupling components may be used. It will also be appreciated that coupler nut 47 threadably attaches at one end of accessory rod 44, and can be coupled to either lid hub 20 or vessel hub 21. The end of rod 44 opposite the end that is threaded into coupler nut 47 spins inside either the castellation bearing space of lid hub 20 or the castellation bearing space of vessel hub 21, whichever hub the coupler nut is not mated with for a given cooking procedure.

Vessel 14 also includes vessel transmission keys 52 for engaging with a motor coupler, described in more detail in the description of FIG. 6, so that torque from a motor fixed to housing 4 shown in FIG. 1 is transferred to vessel 14. Thus, if a user installs coupler nut 47 onto accessory rod 44 and seats the coupler nut onto the vessel coupler hub, accessory 49 would rotate with vessel 14 as it is motivated by motor 62, because the rod and accessory combination, which are threaded together now as one unit, are rotationally fixed to the vessel by way of the coupler nut-to-hub engagement. Threads 45 and 46 may be cut so that resistance caused by food pressing against an accessory shape 49 as the motor rotates the vessel in a preferred direction causes the threaded connection between threads 45 and 46 to tighten. Accordingly, rod 44 would spin relatively freely inside keys 54 of lid coupler hub 20 shown in FIG. 4. This is the embodiment shown in FIGS. 4 and 5.

Alternatively, if coupler nut 47 rotationally couples an accessory 49 to lid coupler hub 20, accessory rod 44 would remain stationary with respect to the lid an housing, as vessel 14 motor 62 coupled to transmission keys 52 rotates the vessel about axis 15 shown in FIG. 1.

Continuing with the description of FIG. 5, annularly canted portion 56 slopes upwardly from the proximal end 26 and outwardly from the center axis 15 of vessel 14. Stabilizer rib 58 are formed onto the outside of vessel 14 so that they extend in direction 59 at least as far from an arbitrary reference point as transmission keys 52 extend in the same direction from the same reference point, thus stabilizing vessel 14 when it has been removed from the cooking capsule 10 and the proximal end placed on a substantially flat surface. Stabilizer rib 58 can be a single annular rib, or a plurality of ribs formed at predetermined locations to provide stability while not interfering with rotational motion of vessel 14 with respect to housing 4, and may further be incorporated as a part of the vessel transmission keys 52 to aid in engaging vessel 14 to motor 62. It will be appreciated that keys 52 and stabilizer 58 may be formed in a separate article of manufacture that may be fixed to the outside bottom of vessel 14.

Turning now to FIG. 6, the figure illustrates a transmission hub 60 coupled to a motor 62 by way of motor shaft 63. Transmission hub 60 defines transmission slots 64 that engage with transmission keys 52. In the embodiment where heater elements 30 are wound in a manner so that they surround vessel 14 when it is located in cooking capsule 10, which includes the heaters 30, wall 28 and heat sink wall 29, the capsule extends down to a predetermined location so that a transmission opening 66 is formed. This transmission opening allows the coupling components hub 60 and keys 52 to extend there through while allowing the heaters to extend down almost to, and even over, canted portion 56 shown in FIG. 5.

Figure 7:
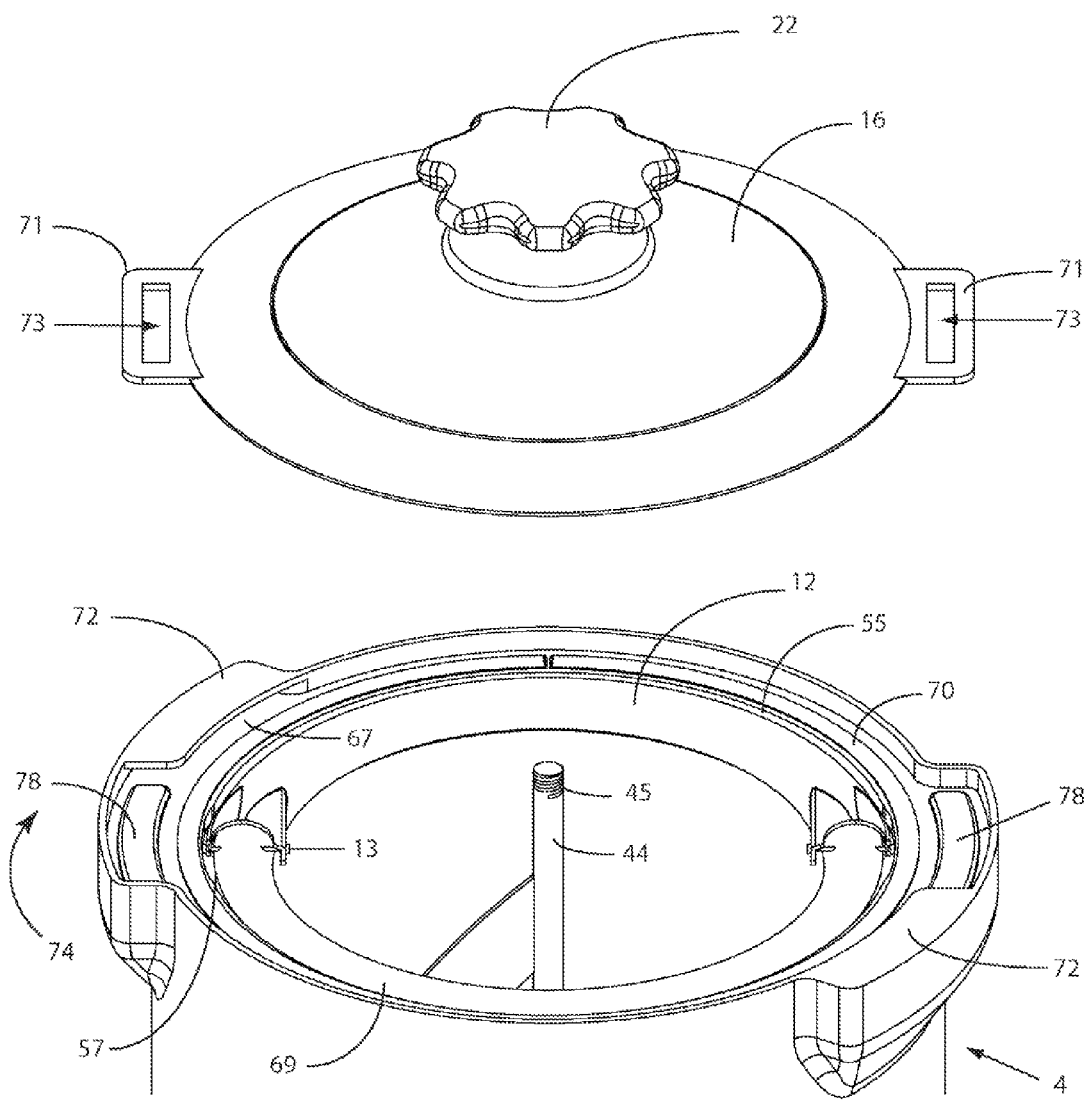
FIG. 7 illustrates components at the distal end of a cooking device.
Figure 11:
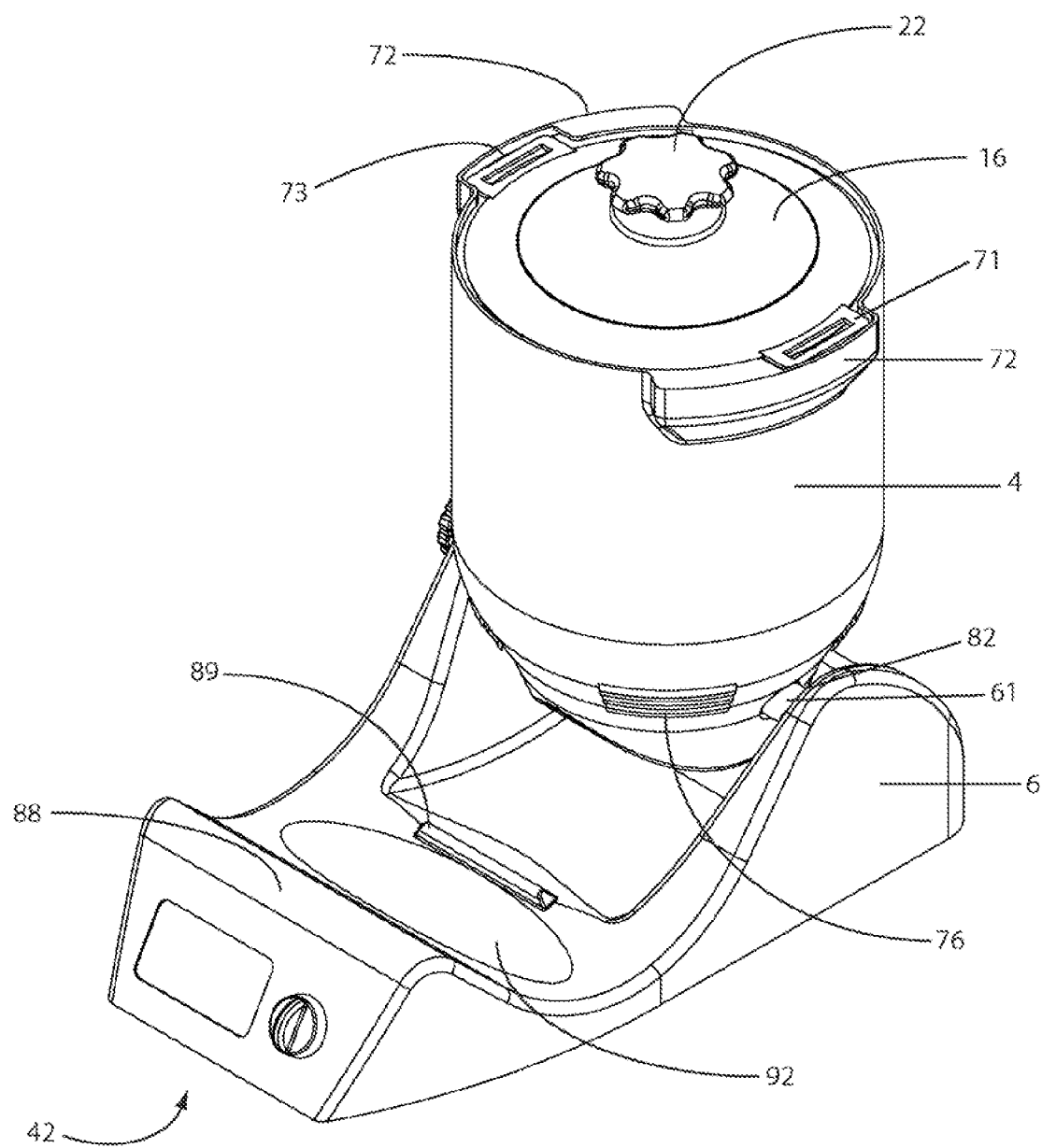
Figure 11A:
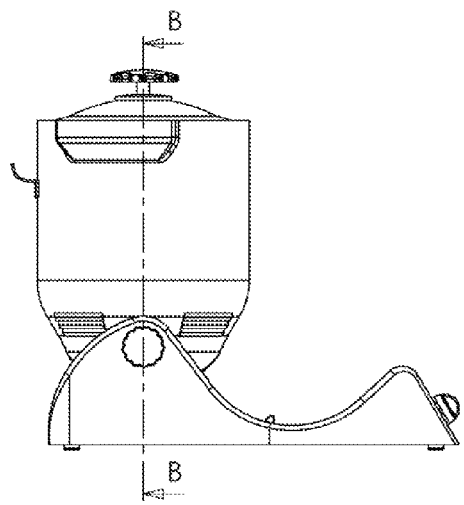
Figure 11B:
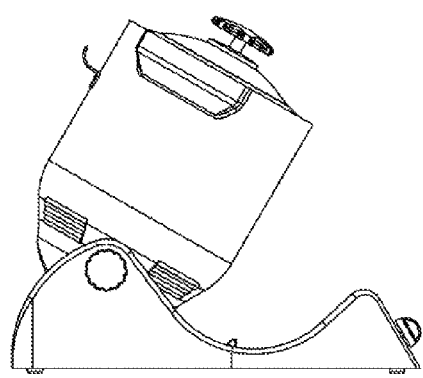
Figure 11C:
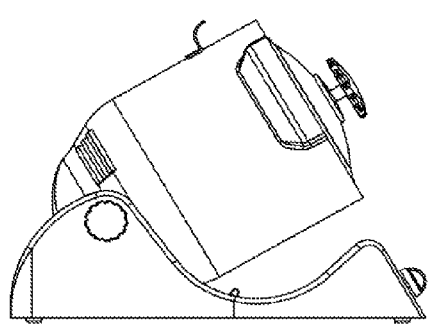
Figure 11D:
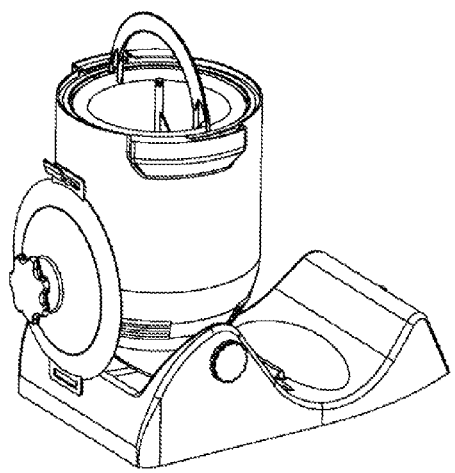
Figure 11E:
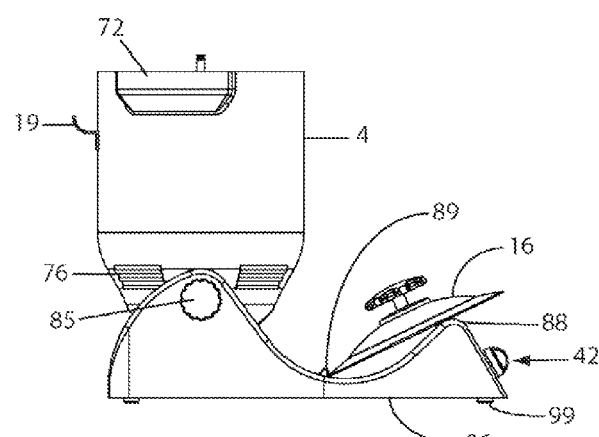

Turning now to FIG. 7, the figure illustrates the distal end of housing 4 of cooking device 2. Housing 4 defines preferably an annular locating wall 55 that rises from an inwardly (toward axis 15 shown in FIG. 1) projecting support floor formed in housing 4 for supporting a retaining flange 57 formed at the annular edge of vessel 14. The support floor (covered by the vessel lip in the figure) supports the flange, and thus vessel 14, when the vessel is placed into housing 4 as described in detail elsewhere herein. Locating wall 55 is approximately the diameter of the retaining flange 57 such that some clearance exists between the circumference of the flange (which is preferably the maximum circumference of the vessel at the distal end thereof) to facilitate rotation of vessel 14 with respect to housing 4. However, even with a clearance between wall 55 and the flange 57, the diameter of the opening defined by the wall is close enough to the diameter of the flange so that vessel 14 rotates substantially about axis 15, even if suspension rollers 11, as described elsewhere herein, are not used.

A lip 69 on the distal end of vessel 14 outwardly flares and transitions the lip into retaining flange 57. A preferably annular gasket 70 is disposed around gasket floor 67 to seal against the lid when it has been installed to housing 4. Lid 16 may include one or more retaining tabs 71 that engage one or more retainers 72. The bottom side (toward the proximal end of vessel 14) of retainers 72 may be angled so that the force exerted on gasket 70 increases as the lid is turned in direction 74. Alternatively, the bottoms of the one or more retainers 72 may be flat and tops (facing out of the page and toward the distal end of vessel 14) of tabs 71 may be angled to form a cam, or wedge, so that the force exerted on gasket 70 increases as the lid is turned in direction 74.

One or more spring loaded retaining buttons 78 oppose the tendency for the lid tabs to rotate out of retainers 72, while at the same time not introducing a solid impediment to installing the lid by rotating it in direction 74. When the lid has been rotated in direction 74, it exerts a force on gasket 70, further stabilizing the lid 16 to the housing and resisting unwanted shifting. If the motor that is rotating vessel 14 is motivating the vessel in the direction opposite direction 74, and device 2 is stirring thick, heavy food for example, the lid would have a tendency to also rotate in the direction opposite direction 74. Thus, these lid stabilizing components cooperate to retain the position of the lid while engaged with the housing. This functionality is especially advantageous when accessories are introduced into the cooking method.

It will be appreciated that other embodiments may include finger springs that project upwardly from gasket floor 67 in direction 74. The finger springs can be metal strips riveted to the gasket floor of housing 4 in the general location of the buttons 78 that are shown in the figure, or they may be molded into housing 4. Thus, the effect is similar to the spikes at a rental car parking lot entrance—the finger/spikes easily deflect when entering the lot/rotating lid in direction 74, but resist deflection if a driver attempts to exit/rotate the lid opposite direction 74. To release either buttons 78, or in the alternative, finger springs, a user would press them down (deflect them from their sprung position) with their fingers, or other object, to allow rotation of lid 16 opposite direction 74.

The cooking device described above has been described in reference to the drawings. The description that follows hereafter further describes aspects, details and embodiments that may, or may not, have been described in reference to FIGS. 1-7. The following description describes items in additional figures FIGS. 8-14 that illustrate further detail and aspects, and the following description may also refer to items previously referred to in reference to FIGS. 1-7.

A removable vessel 14 for holding food or substances to be cooked and/or mixed is placed inside an upper housing 4 for heating and rotation. The shape of the vessel is preferably cylindrical in nature in a smooth interior surface and includes a keyed foot 58 that has a double use as a resting bottom for stabilizing the vessel on a flat surface outside of the device and also for coupling to a complementarily shaped keyed gear hub 64 on a shaft 63 of a motor 62, which motivates rotation of the vessel 14 with respect to the stationary housing 4. The vessel's cooking surface may be coated with, or made from, a non-stick material and is preferably devoid of corners or angled areas around the bottom or sides, thus allowing better contact between the cooking surface and the mass of food being cooked therein, further improving the ability to stir or turn contents without missing particles along the edges or in corners. Vessel hub 21 is fixed to the bottom center of the interior of vessel 14 for the purpose of engaging a removably connectable accessory rod 44 inside the vessel, the rod capable of mounting a variety of optional accessories 49 for stirring, mixing, straining, etc., and/or removal of food and substances.

Vessel 14 further defines an upper open mouthed edge 69 that is formed in a turned over fashion to the outside diameter of the vessel to create a c-shaped lip which, when in use locates into the housing by the cooperation of a location wall 55 and support floor. The lip 69 in cooperation with annular channel 80 formed into the housing guides the vessel during rotation, as shown in section detail in FIG. 14.

Vessel 14 includes an integral vessel handle 12 for removing the vessel vertically through the mouth of the heating/cooking capsule 10. Handle 12 includes two hinges 13 connected to the lip 69 of the top edge/mouth of the vessel at points equally opposing each other on the circumference of the vessel lip; and a cupped or concave formed handle portion arched to match the circumference of the vessel lip, such that when in the resting position matches the convex shape of the vessel lip and stacks together with the vessel lip, thus preventing undue shifting of the handle during rotation of the vessel while in use and giving the handle a set resting position which prevents the handle from impeding the motion of the vessel or contact with the lid 16. The hinge connections 13 may be accomplished in any number of ways, including, but not limited to, pin hinges. The entire handle 12 may be coated with a non-stick material in a similar process as the interior of the vessel to aid in ease of cleaning.

In addition to the vessel's key 52 engagement with the keyed gear hub 60 of the motor assembly shaft 63 and vessel's 14 upper lip guidance by vessel wall 55, the vessel may be further supported and guided by any number of supplemental rollers 11 placed in specified locations around the upper housing just under the location where the vessel lip outside edge rests and above the grid/element assembly. These rollers 11 may incidentally touch the outer surface of the vessel under the lip area according to gravity and the placement and rotation of the vessel to minimize contact between the vessel and the cooking/heating capsule grid surface into which the vessel is inserted. Rollers 11 may be spring mounted to provide a smooth and effective suspension.

The inner-most component of the separator closest to the vessel when it is inserted into the device may be a grid wall 28 that serves multiple functions. One function of grid/wall 28 is to act as a framework to mount the heating elements 30 in a uniform manner. Another function of grid 28 is to form a receptacle area for the vessel 14. The shape of the grid preferably follows the general shape of vessel 14 from just below the plane of the location of the rollers 11 until deviating just after the bottom curve of the of the vessel where drip shield flashing 17 is incorporated to protect the motor assembly 62. There is preferably a minimal air gap 31 between grid wall 28 and vessel 14 when in place. Although incidental, or superficial, contact between the grid and vessel may occur, as discussed above, a roller suspension 11 may be used to minimize such contact.

So long as heat is transferred from the heaters 30 to the vessel in an efficient manner, grid wall 28 may be a large open grate as shown in the figures, or may have any percentage of solid surface to opening ratio as may be deemed appropriate, including, but not limited to, small perforated holes, or no openings at all. Should a heat source by the nature of its shape and surface effectively accomplish the functions of grid/wall 28, the device may also be built without a separate grid/wall.

For precisely controlled cooking of food, the device preferably implements two or more heating elements 30. The drawings illustrate electric coil elements, but the heat source may be any variety of heaters, or heat sources. By having two or more separately and/or simultaneously controlled elements, a user has more options for providing consistency of the types of foods introduced into the device, and according to the tilt and rotation of the vessel while cooking. The heater elements are preferably constructed by attachment to an outer wall of the separator grid wall 28 and cover the heating capsule 10 from just below the top edge/mouth of the grid below the roller locations down to just before the grid ends after the curved, or canted portion 56, of the vessel 14 just before the drip shield flashing 17 at the motor assembly 62. In a two-heater-element scenario, one element 38 may be placed in a continuous spiral, or meandering arrangement along the upper half of the grid. This upper half may be considered as the face that is towards the back of the device when vessel 14 is in the full, upright position. The other element 36 may be placed in a continuous spiral or meandering arrangement along the lower half of the grid 28. This lower half may be considered as the face that is towards the front, control panel 42, side of the device when the vessel is in the full, upright position.

The effective controls allow for precise heating as needed for differing food types and viscosities. For example, a user may need to keep already-prepared food warm, and utilize only the upper coil 38 while the tilt is placed at a greater angle, such as 30 degrees with respect to a flat surface, such as a counter top, on which the cooking device is placed. Another option in the tilted position may be to stir-fry food, for which the lower coil 36 would be used at a greater temperature. Or, the intention may be to boil water for pasta, whereas both coils 36 and 38 will be implemented with the unit in the full upright position of tilt, 90 degrees. Different parameters may be controlled by software according to predetermined programs, examples of which are illustrated later in reference to FIG. 13. The two heater elements 36 and 38 are separately controlled by a computer, knobs, and/or digital device as needed for time and temperature, but may also be locked to function simultaneously as deemed appropriate by the particular cooking process desired.

The heat sink plate, or wall, 29, preferably is an outer wall of the separator, or cooking capsule 10, which preferably includes the inner wall, or grid, that closely conforms to the shape of the vessel, the heaters and the outer wall, or heat sink plate. The drawings herein illustrate the heat sink plate/wall 29 following a similar cylindrical shape as the elements and grid wall 28, however, for outer housings of varying shapes, the sink plate may follow the housing shape, or any other shape effecting the same result. A small, but definitive, air gap 32 preferably exists between the elements 30 and the heat sink plate/wall 29 to avoid contact between the two. The side of plate 29 facing the elements may have a reflective surface to aid is energy efficiency by reflecting heat produced by the elements back towards cooking vessel 14. The intention of the heat sink plate/wall 29 is to work in conjunction with the heat sink fins 33 to reduce the heat transmitted to the outer housing 4, thereby creating a safer environment for the user. Should incidental human contact occur on the outer housing, the intended effect is for the housing only to be warm to the touch, rather than be at a temperature level capable of burning someone.

This reduction in the temperature from the elements 30 to the outer housing 4 is an important aspect that provides additional safety to users. Thus, the heat reduction/attenuation/reflector system includes the reflective heat sink plate 29, the integral heat sink fins, 33, air space 34, and single or double walled outer housing/shell 4. Fins 33 may also function to stabilize/locate capsule 10 in housing 4. The parts of the heat reduction system cooperate with each other to reduce the temperature from that capable of burning a person to being, simply, warm to the touch on the outside of housing 4.

Further aiding in the efficiency of the device is the lid 16. The method by which the lid is secured to the housing is different than past art and is an improvement in the ease of use of removal and placement of a lid for a rotating cooking device. The lid, generally round in shape, includes a clear main body for the purpose of viewing the food as it is rotated and cooked, a metal or other heat resistant solid edging, and further includes two or more wings 71, or tabs, that, when the lid 16 is placed on a gasket seat area 70 over the mouth of the upper housing 4, secure the lid to the housing when the user turns the lid, thus sending the wings 71 under a receiver/receptor 72. Each (if more than one) receptor 72 has a spring loaded button 78 for keeping the lid 16 from disengaging from the housing 4 during reversed spin rotation. The wings of the lid are unique in having openings 73 in the center of at least one wing for the purpose of hanging the lid on the outer housing via a simple hanger 19 of mating shape and size. Furthermore, lid 16 incorporates a unique feature in the lid hub 20 fixed to the underside of the center of the lid. Lid 16 thus provides utility to the cooking process by locating accessory rod 44, which may have removable attachments 49 attached thereto, and thus creates a unique use for a lid vis-á-vis lids used by others. Lid 16 further includes a round knob 22 with equally sized and spaced indents along the circumference edge as needed for griping the knob with a users fingers to aid in engaging or disengaging the lid to the housing 4. The lid hub 20 is secured to the underside of the lid directly under the knob in the center point of the lid facing the interior of the device, vessel, and heating capsule. This hub is valuable in the method of cooking whereby the introduction of optional accessories is utilized, herein discussed later with the description of the example accessories.

Housing 4 includes a single walled, or double walled, shell with framework features capable of supporting the components of the heating capsule 10, vessel 14, heat reduction system, motor(s) 62, joints 82, couplings, flanges, flashing, rollers 11, and other features and aspects described herein. The housing includes vents 76 near its bottom in proximity to the largest flared portion of the heat sink fins 33 and air space 34 which allow for movement of air and further allows both heat and pressure to escape the interior of device and aid in an equalization from the inside of the device to the outside ambient air, thus improving on past attempts and ensuring no pressure builds up underneath the lid, so that removal of the lid 16 any time during operation is safe for the user and prevents injury.

The cooking device includes a motor 62 mounted to the interior of the housing 4 in the cavity under the heating capsule 10 for the purpose of rotating the vessel 14. Motor 62 has a transmission hub 60 which passes through a transmission opening 66 of the cooking capsule 10 to engage stabilizing rib 58 of the vessel 14. Motor 62 may rotate the vessel in either the clockwise or counter-clockwise direction with respect to the vessel's center axis 15. Known methods may be used for controlling the motor, such as using microprocessor and related circuitry, other semiconductor devices such as SCRs and other electronic means known in the art for operating and controlling a motor. The microprocessor and related control circuitry is preferably located in base 6, and coupled to controls on control panel 42 or providing a control interface for a user of device 2. Splash shields 17 in the form of flashing may be incorporated to span any inadvertent openings between the heating capsule 10 and the motor assembly cavity to direct incidental fluids that are spilled into the housing from damaging or reducing the life of the motor(s). Additionally, drain holes 65 preferably exist in the lowest gravitational point of the housing 4 to allow the escape of any such liquids from the device.

The housing 4 further includes central supports 61 located as components or extensions of the housing on either side of the lower third of the housing and motor cavity and incorporate the joints 82 and connections that mount the housing to the base 6. The strength of the central supports 61 is substantial and is able to withstand the torque and weight of the housing 4 and its components and food during operation of the device.

In this central support area 61 are the rotational joints 82 that locate housing 4 with respect to base 6, and facilitate tilting motion of the of housing 4. The tilt may be controlled either manually or automatically through a drive mechanism coupled to a motor 90, which may or may not be the same motor that rotates the vessel. When manual tilt of housing 4, and thus vessel 14, is incorporated, the joint houses a cam with interlocking teeth 83 that enables the user to tilt the housing vertically without effort, but requires the actuation by the user of a safety device in pulling outward on the spring loaded tilt release knob 85 to lower the housing toward the horizontal plane. This necessitates an affirmative, thoughtful effort by a user to be able to lower the mouth of the vessel 14 toward the counter surface/horizontal plane effects an additional safety measure for the user in preventing unwanted spillage of heated, possibly scalding, contents of the vessel. For ultimate safety and avoidance of accidental spillage of the contents of the device, automated, motorized tilting action is the optimum choice for tilt actuation. A second motor 90 may be incorporated in the device and located in available cavity spaces of the housing 4, central support 61, joints 82 or base 6 for the purpose of automation of the tilt function of the device. This automation of tilt further enhances and increases the options to users of infinite tilt settings and programmable cooking methods.

A further component of the base 6 that is intended to increase safety is the safety stop 88. The safety stop is a raised portion of the base that sits directly under the top edge of the mouth of the housing 4 when the tilt is at its greatest intended horizontal angle in such a position as to prohibit the angle of the vessel 14 in the housing from reaching a horizontal angle of zero. The safety stop 88 shaping of this portion of the base 6 is intended to have a dual purpose in being a secondary lid rest area on the device. In some cases the build up of condensate on the underside of the lid 16 may divert the user from wanting to hold the lid with the upper housing's hanger 9. In lieu of hanging the lid on the hanger 9 on the upper housing, the user may place the lid on the base 6 by leaning the upper edge of the lid 16 on the safety stop 88 and allowing it to use gravity to set against a lower point at a lid stop protrusion 89 incorporated on the base 6 just behind the drip cup 92. The base 6 takes a concave shape on the upper surface located between the joints 82 of the base 6 to the upper housing 4 and the safety stop/control panel area 42. This concave area allows for the trapping of liquids coming off of the lid in the resting position on the base. This drip cup 92 area may be a removable cut away portion of the surface of the base 6 that seats in a void or depression in the base surface and made of a dishwasher safe material for easy cleaning.

The base further includes a means of ballast 96 to sturdy the entire device during use. The drawings indicate the ballast as being a heavier, denser, portion of the entire length of the base, but may be in the form of weights or other components, and located, as deemed appropriate to offset the forces of tilt and rotation in the device.

A further means of steadying the device on a surface is the feet 99. The feet are attached to the bottom portion of the base 6 and may be of any number as needed to centralize the distribution of the weight of the device to the surface it is being placed upon. The use of a softer material such as rubber will further aid in preventing the device from moving or shifting upon a given surface.

Accessories may be introduced into the vessel 14 as an optional means of aiding in the mixing, stirring, folding, containing and/or controlling food in the vessel. An accessory 49 is secured to either the lid 16 or vessel 14 by means of a threaded coupler nut 47 which seats onto either the lid hub 20 or vessel hub 21. Coupler nut 47 is secured to either end of the central accessory rod 44 of the accessory 49 by threads 45, which may be included at both ends of accessory rod 44. The accessory 49 when coupled with the lid 16 causes an action of resistance with the food, thus forcing the food to change shape or position as the vessel rotates and the food passes through the stationary accessory. When engaged with the vessel hub 21, the accessory moves in concert with the vessel 14 as it rotates and acts more as an impedance to the food forcing the food to move around, over or through the accessory 49 as it passes near or along the gravitational bottom of the vessel where the bulk of the food will be congregating. The resulting configurations between the coupler nut 47, accessory 49, lid hub 20 and vessel hub 21 allow for four or more different and individual ways one accessory may be used.

The central rod 44 of any stir type accessory is of a constant length and diameter, and has two threaded ends 45 for fitting into the coupler nut 47. The threaded end not being attached to threaded coupler nut 47 fits into the center hollowed spaces inside the castellation formed by the keys of either lid hub 20 or similar vessel hub 21 to allow substantially frictionless rotation of that threaded end 45 in the lid coupler, thus acting as a stabilizing feature for the accessory 49 while in place and in use in the device. Engagement of an accessory with a hub allows reverse rotation of rod 44 without changing the effectiveness of the accessory.

Figure 12A:
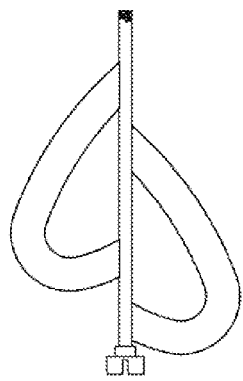
FIGS. 12a, b, c and illustrate four of the interchangeable engagement orientations an accessory can have in relationship to the lid and vessel hubs and coupler nut (a two wing type accessory is shown as an example).
Figure 12B:
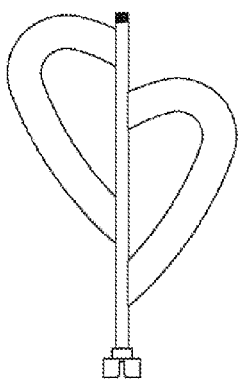
FIG. 12e illustrates an example of one of many stir type designs an accessory can take (double paddle shown).
FIG. 12f illustrates an example of one of many container type designs an accessory can take (colander version with handle shown).
FIG. 12g illustrates a perspective view of the container type accessory showing the indented keyed area for removably connecting it to the vessel coupler hub.
Figure 12C:
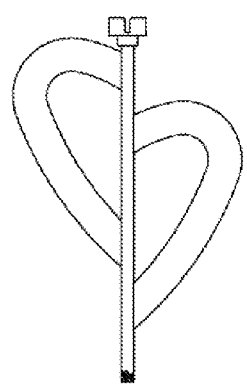
Figure 12D:
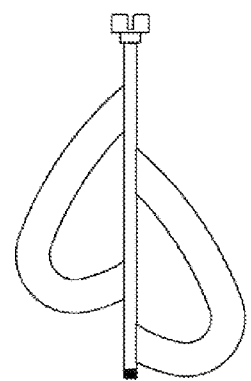
Figure 12E:
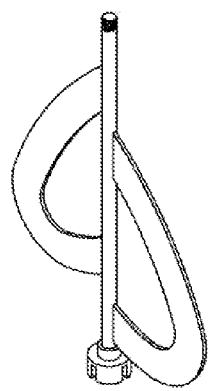
Figure 12F:
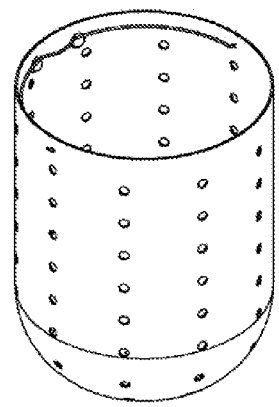
Figure 12G:
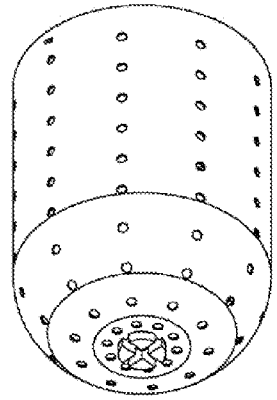

While a majority of accessory designs will be of the stirring or mixing type incorporating the rod system above, other accessory shapes may be introduced into the vessel that do not have a central rod, such as the colander example in FIGS. 12f and g. This type of accessory 49 seats into the vessel 14 with inset groves that mirror portions of the vessel coupler hub 21, and either engage or rest over and around the hub to provide a resting point for the accessory in the vessel. An infinite number of accessories may be designed and shaped to introduce and equally infinite number of methods of cooking.

While common controls currently in use in the market may be an acceptable means of controlling the functions of this device. Device 2 incorporates the further ability to control the device by means of introducing a computerized and/or digitized user interface 42, or control panel, that allows the user to program the desired cooking methods by choosing settings for time, temperature, speed of rotation, direction of rotation, heat source, and tilt of the device as singular functions or in combination with one or more of each feature. The programmable control panel 42 may be computerized in nature, digital, function with knobs, or any combination thereof. A control panel of a computerized nature would allow for programmable features and pre-programming for different cooking methods, including varying sets of configurations of the adjustable features and the ability for a user interface that allows the user to save their own programs for methods of cooking.

As illustrated in FIG. 13, creating or choosing a program will take only seconds for the user to actuate the automation, and then the user is free to walk away and leave the device unattended for the remainder of the cycle. A program may be set, for example, that has the following method of cooking: 5 minutes at low heat/4 rpm spin/60 degree tilt from horizontal/clockwise rotation/bottom coil, then 5 minutes at med heat/6 rpm spin/60 degree tilt/clockwise rotation/bottom and top coils, followed by 5 minutes med-high heat/8 rpm rotation/30 degree tilt/counterclockwise rotation/bottom coil, turning to a keep-warm condition of maximum 60 minutes/low heat/2 rpm/75 degree tilt/clockwise/top coil. This example cooking method would be a successful choice for a healthy fresh vegetable, chicken, and pasta mixture in a light sauce.

Device 2 preferably includes a computer device having control software running thereon. The software instructs the computer device to provide control signals to drive circuitry that provides power to the motor and to supply circuitry that provides power to the heaters. Instructions may be predetermined, and pre-stored in a memory of the computer, or maybe received from a user interface means coupled to the computer device for transferring desired cooking information to the control software. The user interface includes the interfaces described above in connection with control panel 42. The control software commands the drive circuitry to operate the motor and the supply circuitry to supply power to the heaters in response to desired cooking information contained in the pre-stored instruction, or user input though the interface. The computer device is preferably located within the base 6, and may be located as determined appropriate based on packaging/engineering constraints.

A power supply is preferably mounted to the base and is coupled to the motor drive circuitry and coupled to the supply circuitry of the one or more heaters. The drive circuits may include semi conductor devices and other devices and circuit known in the art for controlling motors in response to control signals and the supply circuitry for the one or more heaters may include mechanical relays, semi-conductor switch devices, and current regulating devices as known in the art for controlling power to an electrical heating element. In the alternative, if the heaters include gas burners, the supply circuitry to the one or more burners may include a variable value that regulates flow in response to a control signal.

The electric power supply is preferably adapted to couple to household current, and may also be adapted to operate the device using power from batteries located in base 6. If batteries are used in the power supply, the batteries may be located in the housing to function as the ballast 96 as discussed elsewhere herein.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

What is claimed is:

1. A device for cooking and/or stirring, comprising:
   a vessel for containing contents, the vessel having a center axis, a proximal end and the vessel defining a formed opening at a distal end, wherein the vessel is rotatable about its center axis;
   a cooking capsule capable of receiving the vessel thereinto, wherein the cooking capsule remains stationary as the vessel rotates about its center axis with respect to the cooking capsule;
   one or more heater components for radiating heat toward the vessel;
   a lid that covers the vessel and that remains stationary as the vessel rotates about its center axis with respect to the cooking capsule, wherein the lid secures an accessory that is introduced into the vessel to resist movement of contents therein as the vessel rotates about its center axis with respect to the cooking capsule; and
   wherein the device further comprises a electronic controller system configured to control application of power to a means for rotating the vessel and to the heater components, wherein the electronic controller system can control application of power for rotating the vessel about its axis independently from application of power to the heater components.

2. The device of claim 1 further comprising a separator wall between the one or more heater components.

3. The device of claim 2 wherein the heater components are attached to the separator wall that provides support for the vessel and separates the one or more heater components and the vessel.

4. The device of claim 1 wherein the cooking capsule includes a heat sink wall that surrounds the heater components and reflects heat there from toward the vessel when the vessel is located in the capsule.

5. The device of claim 1 wherein the heater components include one or more electrical heating elements disposed approximately concentrically with respect to the separator and approximately concentrically with respect to the center axis of the vessel when the vessel has been received into the cooking capsule.

6. The device of claim 1 further comprising:
   a base;
   a housing coupled with the cooking capsule, the housing being tiltably coupled to the base and the housing having a motor mounted thereto, the motor adapted to rotate the vessel about the center axis thereof when the vessel in the capsule and is rotatably coupled to the motor via a transmission which passes through a transmission opening of the cooking capsule, wherein the motor composes the means for rotating the vessel about its axis, wherein the housing has a retainer proximate the distal end of the vessel when the vessel has been received into the cooking capsule; wherein the lid includes retainer tabs capable of cooperative engagement with one or more corresponding retainers to retain engagement between the lid and housing during operation of the device, and wherein the electronic controller is configured to receive a lid open signal and to cause the motor to suspend rotating the vessel about its axis if the lid open signal indicates that the lid is open.

7. The device of claim 1, wherein the vessel includes one or more stabilizer ribs that facilitate steady resting of the vessel on a flat surface outside of the device.

8. A device for cooking and/or stirring, comprising:
   a vessel for containing contents, the vessel having a center axis, a proximal end and the vessel defining a formed opening at a distal end, wherein the vessel is rotatable about its center axis;
   a base;
   a housing being tiltably coupled to the base and the housing having a motor mounted thereto;
   a cooking capsule capable of receiving the vessel there into, wherein the cooking capsule remains stationary as the vessel rotates about its center axis with respect to the cooking capsule;
   one or more heater components for radiating heat toward the vessel, wherein the capsule includes a transmission opening at a proximal end;
   a lid that covers the vessel and remains stationary as the vessel rotates about its center axis with respect to the cooking capsule, wherein the lid secures an accessory that is introduced into the vessel to resist movement of contents therein as the vessel rotates about its center axis with respect to the cooking capsule;
   a transmission which passes through the transmission opening;
   wherein the motor motivates rotation of the vessel about the center axis thereof when the vessel is located in the capsule and is rotatably coupled to the motor via the transmission and
   wherein the device further comprises a tilt drive mechanism coupled to the motor, which also motivates automatic tilting of the vessel.

9. The device of claim 8 wherein the vessel includes one or more stabilizer ribs and one or more transmission keys at the proximal end, wherein the transmission keys cooperate with the one or more stabilizer ribs to facilitate stability of the vessel when it rests on a flat surface.

10. The device of claim 9 wherein the transmission includes a transmission hub coupled to the motor, the transmission hub adapted to engage the one or more transmission keys to transmit torque from the motor to the vessel.

11. The device of claim 8 further comprising:
a computer device having control software running thereon, the computer device being coupled to drive circuitry that provides power to the motor, the tilt drive mechanism, and supply circuitry that provides power to the heaters; and
user interface means coupled to the computer device for transferring desired cooking information to the control software such that the control software instructs the drive circuitry to operate the motor, the tilt drive mechanism, and the supply circuitry to supply power to the heaters in response to desired cooking information.

12. The device of claim 11 wherein the control software includes preset values corresponding to a variety of parameters, the present values and parameters stored in a memory of the computer device, and power to the heaters and motor is controlled according to the preset values.

13. The device of claim 11 wherein the computer device is located within the base.

14. The device of claim 11 further including a power supply mounted to the base and that is coupled to the motor drive circuitry and coupled to the supply circuitry of the one or more heaters.

15. The device of claim 14 wherein the power supply couples to household current.

16. The device of claim 14 wherein the power supply includes batteries capable of providing enough energy to operate the device for a predetermined amount of time.

17. A device for cooking and/or stirring, comprising:
a vessel for containing contents, the vessel having a center axis, a proximal end and the vessel defining a formed opening at a distal end, wherein the vessel is rotatable about its center axis;
a cooking capsule capable of receiving the vessel thereinto, wherein the cooking capsule remains stationary as the vessel rotates about its center axis with respect to the cooking capsule;
one or more heater components for radiating heat toward the vessel;
a lid that covers the vessel and remains stationary as the vessel rotates about its center axis with respect to the cooking capsule, wherein the vessel secures an accessory such that the accessory rotates in concert with the vessel as the vessel rotates about its center axis with respect to the cooking capsule to impede movement of contents within the vessel; and
wherein the device further comprises a electronic controller system configured to control application of power to a means for rotating the vessel and to the heater components, wherein the electronic controller system can control application of power for rotating the vessel about its axis independently from application of power to the heater components.

18. The device of claim 1 wherein the accessory includes an accessory rod that is threaded at a coupling end that passes through the lid for securing the accessory to the lid.

19. The device of claim 8 wherein the accessory includes an accessory rod that is threaded at a coupling end that passes through the lid for securing the accessory to the lid.

20. The device of claim 17 wherein the accessory includes an accessory rod that is threaded at a coupling end that passes through the vessel for securing the accessory to the vessel.

* * * * *